US009656551B2

(12) United States Patent
Matsuda

(10) Patent No.: US 9,656,551 B2
(45) Date of Patent: May 23, 2017

(54) STRADDLE ELECTRIC VEHICLE

(75) Inventor: Yoshimoto Matsuda, Kobe (JP)

(73) Assignee: Kawasaki Jukogyo Kabushiki Kaisha, Kobe-shi, Hyogo (JP)

( * ) Notice: Subject to any disclaimer, the term of this patent is extended or adjusted under 35 U.S.C. 154(b) by 484 days.

(21) Appl. No.: 14/354,555

(22) PCT Filed: Feb. 21, 2012

(86) PCT No.: PCT/JP2012/001156
§ 371 (c)(1),
(2), (4) Date: Jun. 17, 2014

(87) PCT Pub. No.: WO2013/061484
PCT Pub. Date: May 2, 2013

(65) Prior Publication Data
US 2014/0292075 A1 Oct. 2, 2014

(30) Foreign Application Priority Data
Oct. 28, 2011 (JP) ................... 2011-006062

(51) Int. Cl.
B60L 1/00 (2006.01)
B62K 11/04 (2006.01)
(Continued)

(52) U.S. Cl.
CPC ............. *B60L 1/00* (2013.01); *B60L 1/003* (2013.01); *B60L 3/003* (2013.01); *B60L 3/0046* (2013.01);
(Continued)

(58) Field of Classification Search
CPC .... B62K 11/04; B62K 2204/00; B62K 19/30; Y04S 30/14; B60L 11/1803; B60L 1/00;
(Continued)

(56) References Cited

U.S. PATENT DOCUMENTS 5,828,192 A * 10/1998 Kawaguchi ......... B60L 11/1807
318/139
2013/0030636 A1* 1/2013 Sugata ................. B60L 3/0061
701/22

FOREIGN PATENT DOCUMENTS

EP 1834830 A1 9/2007
JP 2001114157 * 10/1999 .............. B62J 11/00
(Continued)

OTHER PUBLICATIONS

European Patent Office, Extended European Search Report Issued in Application No. 12844113.6, Jul. 24, 2015, Germany, 8 pages.
(Continued)

Primary Examiner — Jared Fureman
Assistant Examiner — Duc M Pham
(74) Attorney, Agent, or Firm — Alleman Hall Creasman & Tuttle LLP

(57) ABSTRACT

A straddle electric vehicle comprises an electric motor which is a driving power source for activating the vehicle; a high-voltage battery for storing electric power supplied to the electric motor; a low-voltage battery for storing the electric power supplied to an auxiliary machine mounted in the vehicle; a converter for converting a voltage of the electric power supplied from the high-voltage battery to the low-voltage battery into a voltage to be charged into the low-voltage battery; and a case having an insulativity, for storing the high-voltage battery; wherein the low-voltage battery is placed outside the case, and the converter is stored in the case.

14 Claims, 4 Drawing Sheets

(51) Int. Cl.
- B62K 19/30 (2006.01)
- B60L 11/18 (2006.01)
- B60L 3/04 (2006.01)
- B60L 3/00 (2006.01)

(52) U.S. Cl.
CPC ............... *B60L 3/0069* (2013.01); *B60L 3/04* (2013.01); *B60L 11/18* (2013.01); *B60L 11/1803* (2013.01); *B60L 11/185* (2013.01); *B60L 11/1812* (2013.01); *B60L 11/1816* (2013.01); *B60L 11/1846* (2013.01); *B60L 11/1864* (2013.01); *B60L 11/1868* (2013.01); *B60L 11/1874* (2013.01); *B60L 11/1877* (2013.01); *B60L 11/1879* (2013.01); *B62K 11/04* (2013.01); *B62K 19/30* (2013.01); *B60L 2200/12* (2013.01); *B60L 2210/10* (2013.01); *B60L 2240/12* (2013.01); *B60L 2240/26* (2013.01); *B60L 2240/36* (2013.01); *B60L 2240/545* (2013.01); *B60L 2240/547* (2013.01); *B60L 2240/549* (2013.01); *B60L 2250/16* (2013.01); *B62K 2204/00* (2013.01); *B62K 2208/00* (2013.01); *Y02T 10/7005* (2013.01); *Y02T 10/7061* (2013.01); *Y02T 10/7066* (2013.01); *Y02T 10/7072* (2013.01); *Y02T 10/7216* (2013.01); *Y02T 90/121* (2013.01); *Y02T 90/127* (2013.01); *Y02T 90/128* (2013.01); *Y02T 90/14* (2013.01); *Y02T 90/169* (2013.01); *Y04S 30/14* (2013.01)

(58) Field of Classification Search
CPC .... B60L 3/04; B60L 2200/12; B60L 2210/10; B60L 2240/12; B60L 2250/16; Y02T 10/7005; Y02T 90/169
USPC .......................................................... 307/9.1
See application file for complete search history.

(56) References Cited

FOREIGN PATENT DOCUMENTS

| | | | |
|---|---|---|---|
| JP | 2001114157 A | 4/2001 | |
| JP | 2005093144 A | 4/2005 | |
| JP | 2011136626 | * 12/2009 | .............. B62J 11/00 |
| JP | 2010100124 A | 5/2010 | |
| JP | 2010228628 A | 10/2010 | |
| JP | 2010228660 A | 10/2010 | |
| JP | 2011131701 A | 7/2011 | |
| JP | 2011136626 A | 7/2011 | |
| WO | 2010109969 A1 | 9/2010 | |

OTHER PUBLICATIONS

ISA Japanese Patent Office, International Search Report of PCT/JP2012/001156, May 22, 2012, WIPO, 2 pages.

* cited by examiner

STRADDLE ELECTRIC VEHICLE

TECHNICAL FIELD

The present invention relates to a straddle electric vehicle which is a straddle vehicle straddled by a rider, such as a motorcycle, an ATV (all terrain vehicle) or personal watercraft, and is an electric vehicle including as separate components a battery for storing electric power to be supplied to an electric motor and a battery for storing the electric power to be supplied to auxiliary machines.

BACKGROUND ART

In recent years, a straddle electric vehicle which incorporates an electric motor as a driving power source has been developed. In an electric motorcycle which is an example of the straddle electric vehicle, it is necessary to incorporate a battery for supplying electric power to the electric motor. A certain electric motorcycle incorporates a low-voltage battery for activating auxiliary machines in addition to a high-voltage battery for storing the electric power supplied to the electric motor to activate the electric motor (see, e.g., Patent Literature 1).

CITATION LIST

Patent Literature

Patent Literature 1: Japanese Laid-Open Patent Application Publication No. 2011-131701

SUMMARY OF INVENTION

Technical Problem

According to Patent Literature 1, the high-voltage battery is electrically connected to the low-voltage battery, and the low-voltage battery is charged with the electric power stored in the high-voltage battery. In this case, a high-voltage current flows through a high-voltage electric wire extending from the high-voltage battery to the low-voltage battery. Therefore, if the batteries are more distant from each other, the high-voltage electric wire increases in length, which increases manufacturing cost of the electric motorcycle.

Accordingly, an object of the present invention is to reduce the length of the high-voltage electric wire to a shortest possible degree, of the electric wires connecting the batteries to each other.

Solution to Problem

The present invention has been made to attain the above described object. According to the present invention, there is provided a straddle electric vehicle comprising: an electric motor which is a driving power source for activating the vehicle; a high-voltage battery for storing electric power supplied to the electric motor; a low-voltage battery for storing the electric power supplied to an auxiliary machine mounted in the vehicle; a converter for converting a voltage of the electric power supplied from the high-voltage battery to the low-voltage battery into a voltage to be charged into the low-voltage battery; and a case for storing the high-voltage battery; wherein the low-voltage battery is placed outside the case, and the converter is stored in the case.

In accordance with this configuration, a high-voltage current flows through the wire for connecting the high-voltage battery to the converter, while a low-voltage current flows through the wire for connecting the converter to the low-voltage battery. The wire through which the high-voltage current flows can be stored in the case together with the converter. Therefore, the wire through which the high-voltage current flows can be reduced in length. In addition, the low-voltage battery can be made distant from the high-voltage current while reducing the wire through which the high-voltage current flows. Thus, the low-voltage battery can be placed more flexibly. Especially, in the straddle electric vehicle, as compared to a general four-wheeled vehicle, its vehicle body is smaller in size and a space in which the devices are mounted is limited. Because of this, in the straddle electric vehicle, the fact that the low-voltage battery is placed flexibly provides a great advantage. In addition, since the wire through which the high-voltage current flows is stored in the case, the wire can be isolated from the user.

The low-voltage battery may be detachably mounted to a body of the vehicle.

In accordance with this configuration, the low-voltage battery can be replaced easily. Therefore, a battery which tends to be degraded easily can be used as the low-voltage battery. By detaching the low-voltage battery from the body as necessary, it becomes possible to prevent a situation in which a dark current flows through the low-voltage battery, and the low-voltage battery will die undesirably.

The straddle electric vehicle may comprise a control unit for controlling the vehicle; a first electric wire for connecting the control unit to the low-voltage battery; and a relay which is provided on the first electric wire and performs switching between a connected state in which the control unit is connected to the low-voltage battery and a disconnected state in which the control unit is disconnected from the low-voltage battery; the auxiliary machine may include the control unit, and the control unit operates by the electric power supplied from the low-voltage battery via the first electric wire; and the relay may be switched between the connected state and the disconnected state in accordance with a command from the control unit.

In accordance with this configuration, the control unit can determine whether or not to supply the electric power to the control unit.

The straddle electric vehicle may comprise: a second electric wire for connecting the control unit to the low-voltage battery, the second electric wire being different from the first electric wire; a switch which is provided on the second electric wire and performs switching between the connected state in which the control unit is connected to the low-voltage battery and the disconnected state in which the control unit is disconnected from the low-voltage battery; wherein the switch is switched between the connected state and the disconnected state in accordance with a rider's operation.

In accordance with this configuration, since there are two systems for supplying the electric power to the control unit, the electric power can be suitably supplied to the control unit. For example, when a specified time passes after the rider switches the switch to the disconnected state, the control unit switches the relay to the disconnected state, and perform required processing for the specified time.

The straddle electric vehicle may comprise an abnormality detector for detecting whether or not there is an abnormality in a system for supplying the electric power from the high-voltage battery to the electric motor; the auxiliary machine may include a control unit for controlling the high-voltage battery or the electric motor; and when the abnormality detector detects the abnormality, the control unit may cut-off the electric power supplied from the high-voltage battery to the electric motor or the low-voltage battery and operate by the electric power supplied from the low-voltage battery.

In accordance with this configuration, even when the abnormality occurs in the system for supplying the electric power from the high-voltage battery to the electric motor, the electric power supplied from the high-voltage battery is cut-off. Therefore, it becomes possible to avoid a situation in which the abnormality affects the low-voltage battery. Thus, under the state in which the electric power is cut-off, the control unit can continue to operate by the electric power supplied from the low-voltage battery. This allows the control unit to continue to perform control, even when some abnormality occurs in the system.

The auxiliary machine may include a control unit for controlling the high-voltage battery or the electric motor, and the control unit may operate by the electric power supplied from the low-voltage battery; and in response to an OFF command received, the control unit may cut-off the electric power supplied from the high-voltage battery to the electric motor or the low-voltage battery and may then cut-off the electric power supplied from the low-voltage battery to the control unit.

In accordance with this configuration, when the switch is operated, firstly, the control unit which operates by the electric power supplied from the low-voltage battery cuts-off the electric power supplied from the high-voltage battery, and then cuts-off the electric power supplied from the low-voltage battery. This makes it possible to more surely cut-off the electric power supplied from the high-voltage battery. In addition, after the electric power supplied from the high-voltage current is cut-off, the auxiliary machine can be activated by the low-voltage battery, and incorrect stop of the auxiliary machine can be prevented.

In response to an OFF command received in the middle of driving, the control unit may cut-off the electric power supplied from the high-voltage battery to the electric motor or the low-voltage battery, and may cut-off the electric power supplied from the low-voltage battery to the control unit when the control unit detects that the vehicle is stopped.

In accordance with this configuration, the auxiliary machine can operate during the driving after the OFF command is input.

The control unit may detect whether or not the vehicle is stopped based on an input received from a speed sensor attached on a wheel.

In accordance with this configuration, it can be detected more surely that the vehicle is stopped as compared to the configuration in which it is detected that the vehicle is stopped using the rotational speed of the electric motor.

The above and further objects, features and advantages of the present invention will more fully be apparent from the following detailed description of preferred embodiments with accompanying drawings.

Advantageous Effects of Invention

As should be appreciated from the foregoing, in accordance with the present invention, it is possible to reduce the length of the high-voltage electric wire to a shortest possible degree, of the electric wires connecting the batteries to each other.

DESCRIPTION OF EMBODIMENTS

Hereinafter, embodiments of the present invention will be described with reference to the accompanying drawings. Throughout the drawings, the same or corresponding components are designated by the same reference symbols and will not be described in repetition in detail. The stated directions are referenced from the perspective of a rider riding in an electric motorcycle which is an exemplary straddle electric vehicle according to the embodiment.

Figure 1:
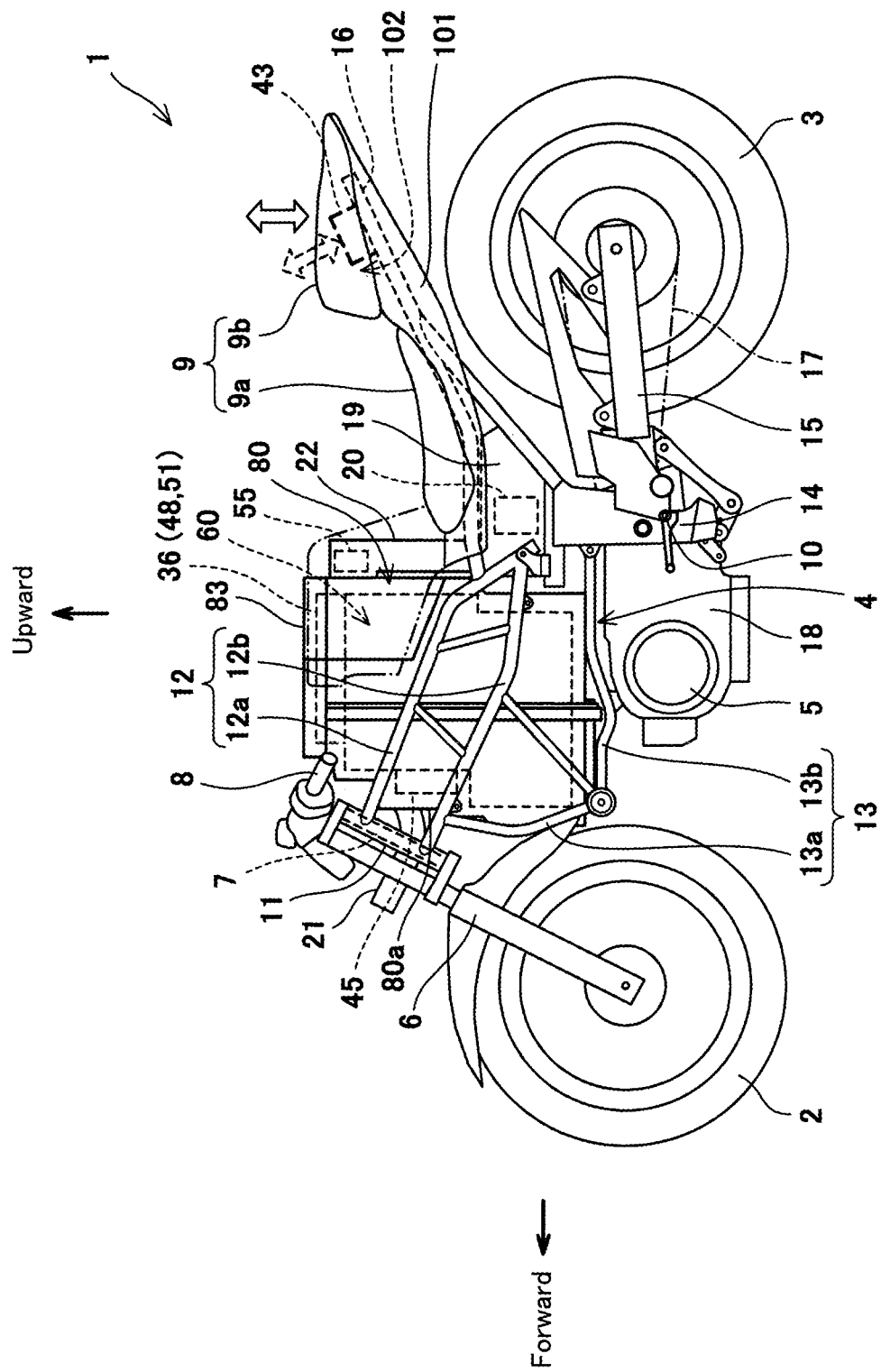
Fig. 1 is a left side view of an electric motorcycle which is an exemplary straddle electric vehicle according to Embodiment 1 of the present invention.

Fig. 1 is a left side view of an electric motorcycle 1 which is an exemplary straddle electric vehicle according to Embodiment 1 of the present invention. As shown in Fig. 1, the electric motorcycle 1 includes a front wheel 2 which is a driven wheel, a rear wheel 3 which is a drive wheel, a vehicle body frame 4 which is disposed between the front wheel 2 and the rear wheel 3, and an electric motor 5 which is a driving power source for moving the electric motorcycle 1. The electric motorcycle 1 of the present embodiment is not equipped with an internal combustion engine and is able to drive by rotating the rear wheel 3 by driving power generated in the electric motor 5.

The front wheel 2 is rotatably mounted to the lower portion of a front fork 6 extending substantially vertically. A steering shaft 7 for steering the front wheel is coupled to the upper portion of the front fork 6, and a bar-type handle 8 is attached to the upper portion of the steering shaft 7. The vehicle body frame 4 includes the head pipe 11, a pair of right and left main frames 12, a pair of right and left down frames 13, and a pair of right and left pivot frames 14.

The steering shaft 7 is rotatably supported by the head pipe 11. Each of the right and left main frames 12 includes an upper frame member 12a and a lower frame member 12b. The upper frame member 12a extends substantially in parallel with the lower frame member 12b. The upper frame member 12a and the lower frame member 12b extend rearward from the head pipe 11 such that they are inclined downward. The upper frame member 12a is bent downward at its rear end portion and is connected to the lower frame member 12b. Each of the down frames 13 includes a vertical frame member 13a extending substantially downward from the perspective of the head pipe 11, and a lower frame member 13b extending rearward substantially horizontally from the lower end of the vertical frame member 13a. The pivot frames 14 are connected to the rear end portions of the main frames 12 and the rear end portions of the lower frame members 13b.

The pivot frames 14 are connected to a swing arm 15 and a seat frame 16. The swing arm 15 extends substantially in a forward or rearward direction and is coupled at its front end portion to the pivot frames 14 such that the swing arm 15 is pivotable and supports the rear wheel 3 at its rear end portion such that the rear wheel 3 is rotatable. The seat frame 16 extends rearward from the rear end portions of the upper frame members 12a and the upper end portions of the pivot frames 14 such that the seat frame 16 is inclined upward.

A tandem seat 9 on which the rider and a passenger are seated in the forward or rearward direction is mounted to the seat frame 16. The seat 9 includes a rider seat 9a at a front side and a passenger seat 9b at a rear side. In the present embodiment, there is a vertical level difference between the rider seat 9a and the passenger seat 9b. The passenger seat 9b is placed at a higher position than the rider seat 9a.

The electric motorcycle 1 is a straddle vehicle. The rider straddles the seat 9 (rider seat 9a). The lower end portions of the right and left pivot frames 14 are provided with a pair of right and left foot steps 10 (right foot step 10 is not shown in Fig. 1), respectively. The seat 9 is placed rearward relative to the steering shaft 7 and the head pipe 11. The rider straddling the seat 9 and facing forward can stretch hands forward and grip the handle 8. The rider straddling the seat 9 puts the rider's left foot on the left foot step 10 in a position which is leftward relative to the left pivot frame 14, and the rider's right foot on the right foot step 10 in a position which is rightward relative to the right pivot frame 14. Since the rider straddles the vehicle body in this way, the straddle vehicle has a small vehicle width in at least a region which is near the seat 9. Especially, the motorcycle turns at a high speed by achieving a balance between a centripetal force generated by a banked state of the vehicle body, and a centrifugal force. For this reason and because the motorcycle is of a straddle type, the motorcycle has a small vehicle width as a whole.

As described above, the electric motor 5 is the driving power source of the electric motorcycle 1 of the present embodiment. For this purpose, the electric motorcycle 1 includes a high-voltage battery unit 60 for storing the electric power to be supplied to the electric motor 5. The high-voltage battery unit 60 is stored in the battery case 80. In the present embodiment, the battery case 80 is manufactured by an insulating material. The battery case 80 contains electric components including the high-voltage battery unit 60. The electric components stored in the battery case 80 include, for example, a DC/DC converter 45.

The electric motorcycle 1 includes a motor case 18 and an inverter case 19 in addition to the battery case 80. The motor case 18 contains the electric motor 5, while the inverter case 19 contains the electric components including an inverter 20. The high-voltage battery unit 60 is able to store DC power. The inverter 20 converts the DC power stored in the high-voltage battery unit 60 into the AC power. The electric motor 5 operates by the AC power generated by the conversion in the inverter 20 to generate the driving power. The driving power generated in the electric motor 5 is transmitted to the rear wheel 3 via a driving power transmission mechanism 17. The driving power transmission mechanism 17 may contain a transmission 17a (see Fig. 2). In this case, the transmission 17a may be stored in the motor case 18 together with the electric motor 5 (see Fig. 2).

In the present embodiment, the motor case 18 is mounted to the down frames 12 and the pivot frames 14 and placed in a region below the down frames 12 and in front of the pivot frames 14. The battery case 80 is placed between the steering shaft 7 and the seat 9 in the forward or rearward direction, put on the lower frame members 13b, and sandwiched between the right and left main frames 12. The inverter case 19 is placed in a space of a substantially-inverted-triangle shape when viewed from a side, which is surrounded by the main frame 12, the pivot frame 14 and the seat frame 16, and positioned rearward relative to the lower rear end portion of the battery case 80 and below the front end portion of the seat 9.

An air-intake duct 21 is coupled to the front surface of the battery case 80, while an air discharge duct 22 is coupled to the rear surface of the battery case 80. The air-intake duct 21 extends forward from the front surface of the battery case 80. The air discharge duct 22 extends downward from the upper portion of the rear surface of the battery case 80 and is coupled to the upper surface of the inverter case 19. By providing these ducts 21, 22, ram air from forward is taken into the air-intake duct 21, and sent to the interior of the battery case 80 via the air-intake duct 21. Also, the air is discharged from the interior of the battery case 80 and sent to the interior of the inverter case 19 via the air discharge duct 22. In this way, the electric components stored in the battery case 80 and the electric components stored in the inverter case 19 can be cooled by the air. As a result, reliability of the operation of these electric components can be maintained. A fan 55 is attached on the rear portion of the battery case 80. The rotation of the fan 55 allows the air to be sent well from the interior of the battery case 80 to the air discharge duct 22.

In addition to the electric motor 5, the electric motorcycle 1 incorporates a plurality of auxiliary machines activated by the electric power. The electric motorcycle 1 includes a low-voltage battery 43 for storing the electric power supplied to these auxiliary machines. The low-voltage battery 43 is able to store DC power with a lower voltage (e.g., 12V) than the high-voltage battery unit 60. The low-voltage battery 43 is placed outside the battery case 80. The low-voltage battery 43 is detachably mounted to a body (vehicle body in the present embodiment) of the vehicle.

Figure 2:
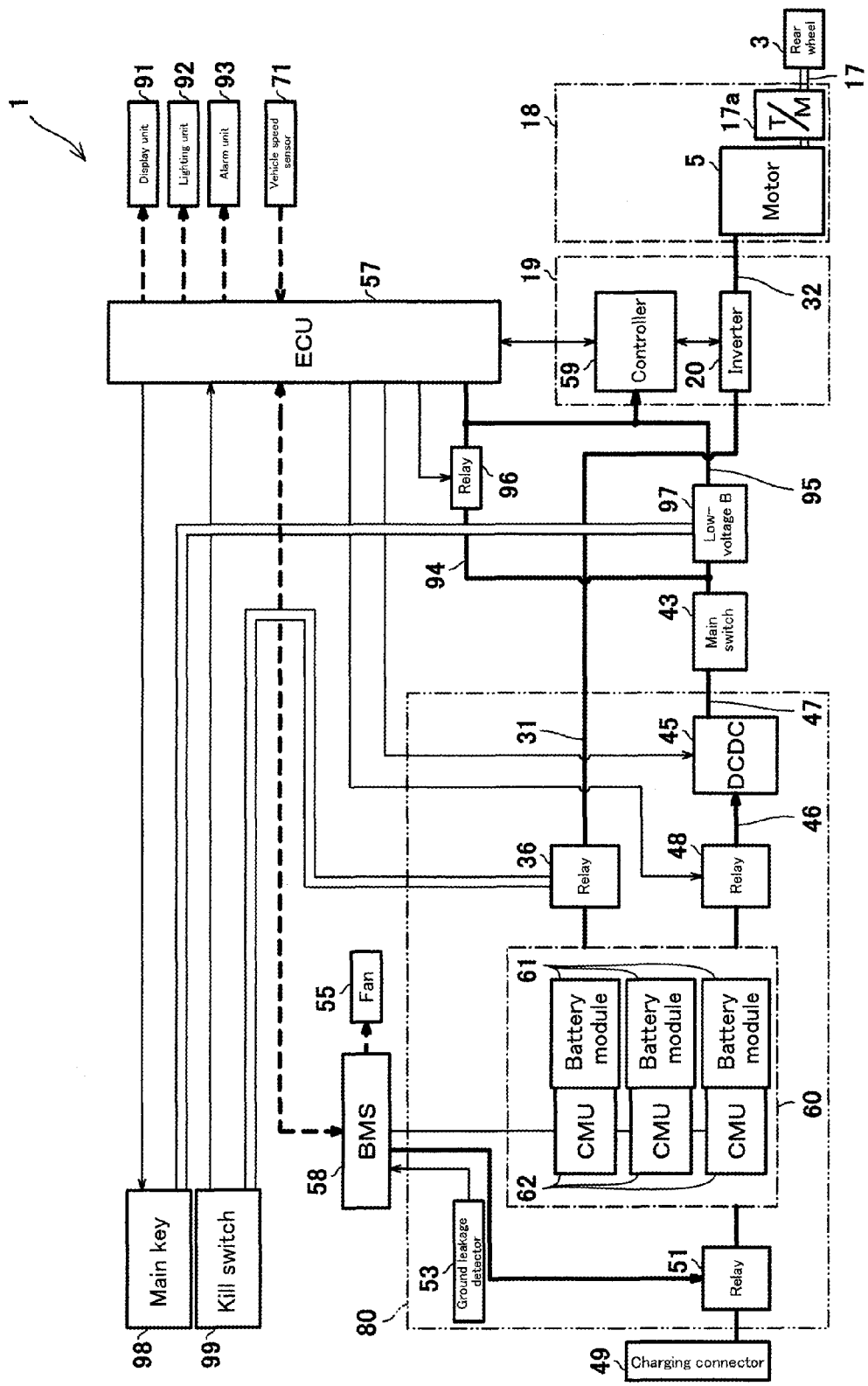
Fig. 2 is a conceptual view showing an electric configuration of the electric motorcycle of Fig. 1.

Fig. 2 is a conceptual view showing an electric configuration of the electric motorcycle 1 of Fig. 1. In Fig. 2, bold lines indicate a strong electric system (electric power supply system), thin lines indicate a weak electric system (signal system), and double lines indicate mechanical connection. Hereinafter, the strong electric system will be mainly described regarding the electric configuration of the electric motorcycle 1, with reference to Fig. 2, and then the layout of the battery case 80 and the low-voltage battery 43 will be described with reference to Fig 1. After that, again, with reference to Fig. 2, the weak electric system as well as the strong electric system will be described regarding the electric configuration of the electric motorcycle 1.

As shown in Fig. 2, the electric motorcycle 1 includes the high-voltage battery unit 60, the inverter 20, the electric motor 5, the low-voltage battery 43, and the plurality of auxiliary machines as described above. The electric motorcycle 1 further includes the DC/DC converter 45 and the charging connector 49.

The high-voltage battery unit 60 includes a plurality of battery modules 61. Each of the battery modules 61 is an assembled battery in which a plurality of battery cells are stored in a box-like module casing. The plurality of battery cells are aligned and electrically connected in series to each other in the interior of the module casing. Each of the battery cells is a secondary battery which is capable of storing DC power, and is, for example, a lithium ion battery or nickel metal hydride. The plurality of battery cells 61 are electrically connected to each other. As a result, the high-voltage battery unit 60 serves as a high-voltage DC secondary battery in which many battery cells are connected together (e.g., 60V to 200V).

The high-voltage battery unit 60 is connected to the inverter 20 via a high-voltage electric wire 31. The inverter 20 is connected to the electric motor 5 via a three-phase wire 32. The inverter 20 receives the DC power from the high-voltage battery unit 60 via the high-voltage electric wire 31. The electric motor 5 receives the AC power generated by the conversion by the inverter 20 via the three-phase wire 32.

The DC/DC converter 45 is connected to the high-voltage battery unit 60 via a first converter wire 46. The low-voltage battery 43 is connected to the DC/DC converter 45 via a second converter wire 47. Thus, the low-voltage battery 43 is electrically connected to the high-voltage battery unit 60 via the second converter wire 47, the DC/DC converter 45, and the first converter wire 46. This allows the electric power stored in the high-voltage battery unit 60 to be supplied to the low-voltage battery 43. The DC/DC converter 45 converts the voltage of the DC power to be supplied from the high-voltage battery unit 60 to the low-voltage battery 43 into a voltage to be charged into the low-voltage battery 43 by dropping the voltage. This allows the electric power stored in the high-voltage battery unit 60 to be charged into the low-voltage battery 43.

The high-voltage battery unit 60 is connected to the charging connector 49 via a changing wire 50. The charging connector 49 is connectable to the outside electric power supply. In a state in which the outside electric power supply is connected to the charging connector 49, the electric power is supplied from the outside electric power supply to the high-voltage battery unit 60 via the charging wire 50, to charge the high-voltage battery unit 60. At this time, the DC/DC converter 45 can drop the voltage of the electric power of the outside electric power supply, and the low-voltage battery 43 can be charged with the resulting electric power of the outside electric power supply.

The low-voltage battery 43 is connected to the plurality of auxiliary machines and serves as an electric power supply for activating these auxiliary machines, i.e., the electric components which are other than the electric motor 5 for driving the vehicle. The plurality of auxiliary machines which are supplied with the electric power from the low-voltage battery 43 include a control unit, a display unit 91, a lighting unit 92, an alarm unit 93, the fan 55, etc. The display unit 91 displays driving states such as a vehicle speed and a gear position, and abnormality information when some abnormality occurs. The lighting unit 92 includes a head light, a tail lamp, a winker lamp, and a gear position lamp. The control unit includes an electric control unit (ECU) 57, a battery monitoring system (BMS) 58 and an inverter controller 59. The ECU 57 performs overall control for the operation of the electric motorcycle 1. The BMS 58 permits the high-voltage battery unit 60 to be charged or inhibits the high-voltage battery unit 60 from being charged, monitors SOC (state of charge) and a temperature state of the high-voltage battery unit 60, and controls the operation of the fan according to the temperature state of the high-voltage battery unit 60. The high-voltage battery unit 60 includes a plurality of cell monitoring units (CMUs) 62 corresponding to the battery modules 61, respectively. The BMS 58 determines the SOC of the high-voltage battery unit 60 based on information from the CMUs 61. The inverter controller 59 controls the switching operation of the inverter 20, and hence the operation of the electric motor 5. The ECU 57 is connected to an accelerator sensor (not shown) for detecting a displacement amount of the accelerator grip, and provides a control command to the inverter controller 59 based on a detected value of the accelerator sensor. The inverter controller 59 controls the inverter 20 in response to a control command from the ECU 57. This allows the electric motor 5 to generate the driving power in response to the rider's request.

In addition to the above, the electric components included in the auxiliary machines include sensors such as a speed sensor, a rotational speed sensor, and a current sensor. In a case where an electric oil pump for circulating oil for lubrication and cooling is used, the low-voltage battery 43 may be used to supply the electric power to the oil pump. Or, the low-voltage battery 43 may be used to supply the electric power to an ABS hydraulic unit, an electronic control steering damper, an electric wind shield, an ETC device, and an audio device. The low-voltage battery may be selected so that the electric power for activating the electric components matches the electric power discharged from the battery. A motorcycle including an engine is also equipped with the battery as the electric power supply for activating the electric components. If the voltage of the low-voltage battery 43 is equal to a voltage of the battery incorporated into a conventional engine-driven vehicle, the electric motorcycle and the engine-driven vehicle can incorporate the same electric components, which is convenient.

Among the electric components described above, the DC/DC converter 45 is stored in the battery case 80. The inverter 20 is stored in the inverter case 19 which is different from the battery case 80. The electric motor 5 is stored in the motor case 18 which is different from the battery case 80. The low-voltage battery 43 is placed outside the battery case 80. Therefore, a portion of the high-voltage electric wire 31, the entire of the first converter wire 46, and a portion of the second converter wire 47 are stored in the battery case 80.

The first converter wire 46 constitutes a wire member connecting the DC/DC converter 45 to the high-voltage battery unit 60. The second converter wire 47 constitutes a wire member connecting the DC/DC converter 45 to the low-voltage battery 43. When the low-voltage battery 43 is charged, a low-voltage current generated by dropping the voltage in the DC/DC converter 45 flows through the second converter wire 47, while a high-voltage current before dropping the voltage flows through the first converter wire 46.

In the present embodiment, since the DC/DC converter 45 is stored in the battery case 80 together with the high-voltage battery unit 60, the entire first converter wire 46 can be stored in the battery case 80. Therefore, the first converter wire 46 through which the high-voltage current flows can be reduced in length. Since the battery case 80 has an insulativity, the first converter wire 46 can be isolated from a user mechanically and electrically. If the first converter wire 46 is relatively long in length and the second converter wire 47 is relatively short in length, cost of the entire wires, which is required to connect the high-voltage battery unit 60 to the low-voltage battery 43 increases. If the first converter wire 46 is exposed outside the battery case 80, it is required to have a structure for allowing the first converter wire 46 to be isolated from the user, and the vehicle body is required to have a structure for allowing the first converter wire 46 to be isolated from the user. This will increase manufacturing cost.

Since the first converter wire 46 is stored in the battery case 80 and isolated from the user like the present embodiment, only the second converter wire 47 becomes long, even when the low-voltage battery 43 is isolated away from the high-voltage battery unit 60. Therefore, an increase in the manufacturing cost does not increase. Therefore, it is not necessary to place the low-voltage battery 43 near the high-voltage battery unit 60 in view of the manufacturing cost. Thus, the low-voltage battery 43 can be placed more flexibly. As described above, the straddle vehicle, especially, the motorcycle has a vehicle body which is smaller in size than that of a vehicle such as a general four-wheeled vehicle. Because of this, a space in which the devices are mounted is limited. Therefore, the fact that the low-voltage battery 43 can be placed more flexibly has a great advantage to the straddle vehicle, especially the motorcycle.

Since the first converter wire 46 through which the high-voltage current flows is stored in the battery case 80 having an insulativity, it becomes possible to prevent a situation in which ground leakage from the first converter wire 46 affects an outside area of the battery case 80. A converter relay 48 for opening and closing the first converter wire 46 is provided on the first converter wire 46. The converter relay 48 is stored in the battery case 80. Therefore, even when ground leakage from the converter relay 48 occurs, it becomes possible to prevent a situation in which the ground leakage from the converter relay 48 affects an outside area of the battery case 80. Since the converter relay 48 is placed inside the battery case 80 together with the DC/DC converter 45, the DC/DC converter 45 is placed in the vicinity of the high-voltage battery unit 60, and therefore the converter relay 48 can also be placed in the vicinity of the high-voltage battery unit 60.

If the charging connector 49 is stored in the battery case 80 or attached to the outer surface of the battery case 80, the entire charging wire 50 can be stored in the battery case 80. This allows the charging wire 50 to be isolated from the user mechanically and electrically, which is an advantage. Since the inverter case 19 is positioned near the battery case 80, it becomes possible to reduce a portion of the high-voltage electric wire 31, which portion is placed outside the battery case 80, even when the inverter 20 is placed outside the battery case 80. An inverter relay 33 for opening and closing the high-voltage electric wire 31 is provided on the high-voltage electric wire 31. A charging relay 51 for opening and closing the charging wire 50 is provided on the charging wire 50. These relays 33 and 51 are also stored in the battery case 80. Since all of the relays 33, 48, 51 on the wires through which the high-voltage current flows are stored in the battery 80, it becomes possible to suitably prevent a situation in which the ground leakage of the high-voltage current affects the outside area of the battery case 80.

Turning back to Fig. 1, the battery case 80 of the present embodiment is placed between the steering shaft 7 and the seat 9 in the forward or rearward direction, put on the lower frame members 13b, and sandwiched between the right and left main frames 12.

The battery case 80 includes an upper lid 83 for opening and closing the upper portion of the battery case 80. The upper lid 83 is firmly attached to the body of the battery case 80 by means of a bolt, and the like, to seal the inner space of the battery case 80. This allows the electric components stored in the battery case 80 to be isolated from the user mechanically and electrically. By detaching the upper lid 83, a maintenance operator can access the interior of the battery case 80. Thus, maintenance of the electric components stored in the battery case 80 can be easily carried out.

The front surface of the battery case 80 is offset rearward in a stepwise manner, in an upward direction. This makes it possible to prevent interference between the handle 8 and a portion of the battery case 80 which portion is located above the main frames 12. In addition, a portion of the battery case 80 which portion is located below the main frames 12, is increased in size in a forward direction to fill a dead space which is behind the front wheel 2, which contributes to an increase in a battery capacity.

In the present embodiment, the DC/DC converter 45 is stored in the front upper portion of the battery case 80. The front wall of the battery case 80 includes a converter cover section 80a covering the DC/DC converter 45 from forward. The air-intake duct 21 is connected to the converter cover section 80a. In this structure, the air flowing from the air-intake duct 21 into the battery case 80 can be firstly blown to the DC/DC converter 45. The DC/DC converter 45 generates a great amount of heat during its operation. Since the air is blown to the DC/DC converter 45 in an initial stage of the air inflow to the battery case 80, the DC/DC converter 45 can be suitably cooled by the air, and hence a temperature increase in the entire interior of the battery case 80 can be suitably suppressed.

The low-voltage battery 43 is placed outside the battery case 80. This makes it possible to increase the number of components of the high-voltage battery unit 60 (module casings 61 or the battery cells) stored in the battery case 80. The low-voltage battery 43 is placed in a position different from the position between the head pipe 11 and the seat 9. This allows more battery cells to be placed between the head pipe 11 and the seat 9. Especially, in the present embodiment, as will be described later, the low-voltage battery 43 is placed below the seat 9 such that it is distant from the battery case 80. This makes it possible to avoid a situation in which the low-voltage battery 43 is affected by heat generated in the high-voltage battery unit 60 during its operation. Also, the air discharge duct 22 for air-cooling is connected to the battery case 80. The low-voltage battery 43 can be placed to be distant from the air discharge duct 22. This makes it possible to avoid a situation in which the low-voltage battery 43 is affected by heated air flowing through the air discharge duct 22.

Furthermore, the low-voltage battery 43 is placed outside the battery case 80 and is detachably mounted to the body (vehicle body) of the vehicle. In the present embodiment, the low-voltage battery 43 is stored in a battery storage space 101 formed under the passenger seat 9b. The electric motorcycle 1 is provided with a seat side cover 102 such that the seat side cover 102 covers the side portions and upper portion of the seat frame 16. The rider seat 9a is mounted to the front upper portion of the seat side cover 102, while the passenger seat 9b is detachably mounted to the rear upper portion of the seat side cover 102. Although in the present embodiment, the rider seat 9a and the passenger seat 9b are separate components, they may be a single component. The battery storage space 101 is formed in the rear portion of the seat side cover 102 and configured to be opened and closed by the passenger seat 9b.

Figure 3:
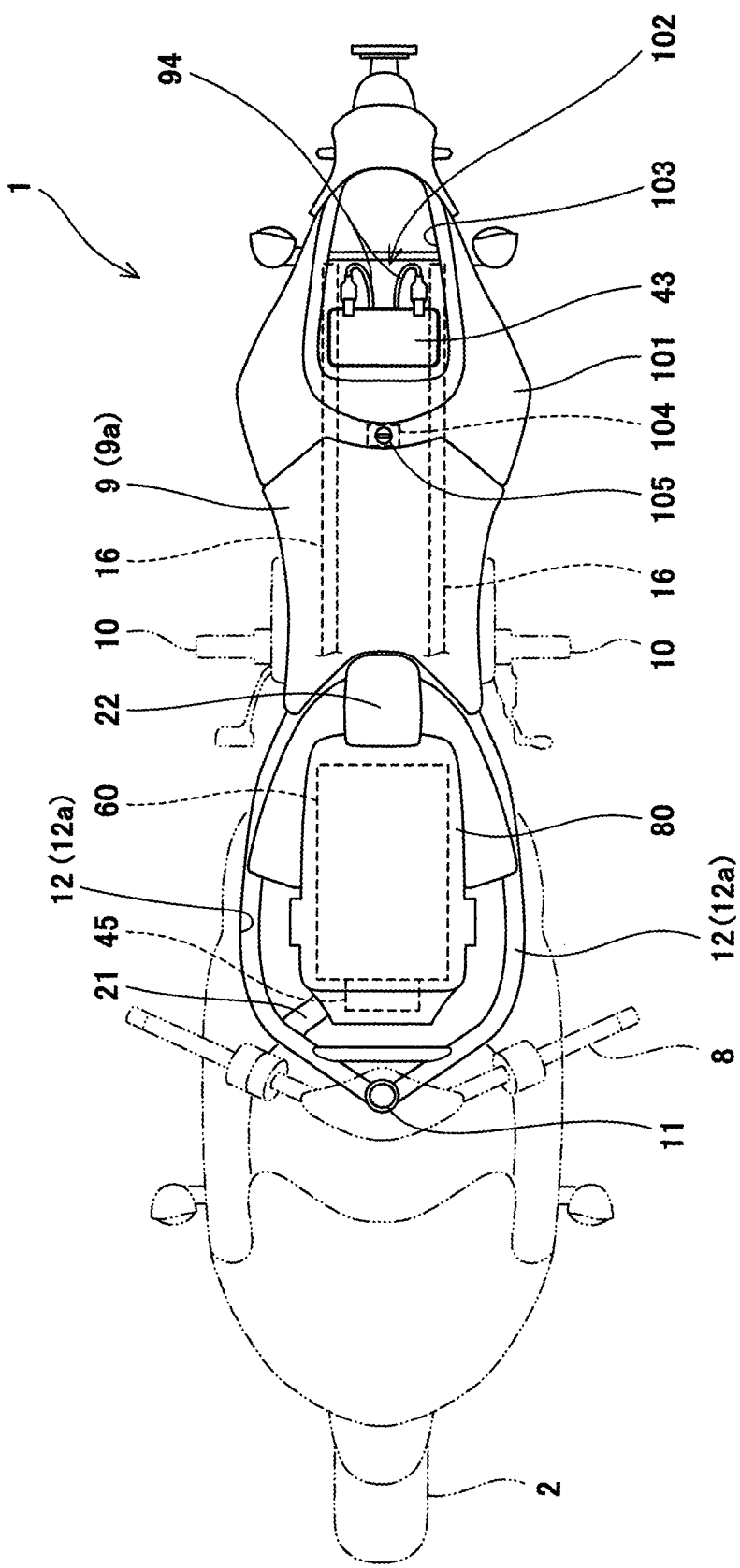
Fig. 3 is a plan view showing a state in which a seat is detached from the electric motorcycle of Fig. 1.

Fig. 3 is a plan view of the electric motorcycle 1, showing a state in which the passenger seat 9b is detached from the electric motorcycle 1 of Fig. 1. As shown in Fig 3, the rear upper portion of the seat side cover 102 is provided with an opening 103 which opens upward. The user can access the battery storage space 101 through the opening 103. The low-voltage battery 43 is placed such that it overlaps with the opening 103 when viewed from above. Therefore, when the passenger seat 9b is detached, the user can easily see the low-voltage battery 43 through the opening 103, and easily access the low-voltage battery 43 through the opening 103.

The low-voltage battery 43 is detachably mounted to the seat frame 16 and the seat side cover 102. By detaching the passenger seat 9b and detaching the wire connected to the low-voltage battery 43, the user can easily carry out a maintenance work and a replacement work of the low-voltage battery 43. Since the low-voltage battery 43 can be replaced easily in this way, degradation of the low-voltage battery 43 can be easily addressed. In other words, as the low-voltage battery 43, a lead storage battery which tends to be degraded relatively easily can be used. As a result, the manufacturing cost does not increase. In addition, the battery storage space 101 is formed between the pair of right and left vehicle body frames (e.g., seat frame 16). The low-voltage battery 43 is stored in the battery storage space 101, and placed between the pair of right and left vehicle body frames (e.g., seat frame 16). This allows the wire 47 connecting the low-voltage battery 43 to the DC/DC converter 45 to be placed in an inward region of the right and left vehicle body frames (e.g., seat frame 16). Therefore, disconnection of the wire 47 can be prevented even when the vehicle body falls down.

In particular, in the present embodiment, the low-voltage battery 43 can be charged with the electric power supplied from the high-voltage battery unit 60. Therefore, the capacity of the low-voltage battery 43 can be reduced, and hence the manufacturing cost of the low-voltage battery 43 can be further reduced. In addition, since the low-voltage battery 43 can be placed flexibly and can be reduced in size as described above, it can be stored in a small space formed below the passenger seat 9b.

The lead storage battery tends to generate a dark current. If the vehicle is not used for a long period of time, the battery will die. According to the present embodiment, the low-voltage battery 43 can be easily detached. If the user determines that the vehicle will not be used for a long period of time, the user may detach the low-voltage battery 43 and store it in a certain place, unnecessary discharge of the low-voltage battery 43 can be avoided. As the low-voltage battery 43, another battery such as a capacitor may be used, instead of the lead storage battery.

When the passenger seat 9b is mounted to the seat side cover 102, the battery storage space 101 is locked by a lock mechanism 104. The passenger seat 9b cannot be detached unless the lock mechanism 104 is unlocked by fitting a main mechanical key of the vehicle into a cylinder lock 105 provided in the seat side cover 102. Since the battery storage space 101 can be locked in this way, it become possible to prevent a situation in which the low-voltage battery 43 is detached undesirably.

Turning back to Fig. 2, the low-voltage battery 43 is connected to the ECU 57 via two strong electric systems. In other words, the low-voltage battery 43 is connected to the low-voltage battery 43 via a first electric wire 94. A second electric wire 95 which is different from the first electric wire 94 branches from the first electric wire 94, and is connected to the first electric wire 94 again. As a result, the ECU 57 is also connected to the low-voltage battery 43 via the second electric wire 95. The first electric wire 94 has two connection points at which the first electric wire 94 is connected to the second electric wire 95.

In the present embodiment, the inverter controller 59 is connected to the second electric wire 95. The inverter controller 59 can be supplied with the electric power from the low-voltage battery 43 via the second electric wire 95. The BMS 58 is connected to the ECU 57 and can be supplied with the electric power from the low-voltage battery 43 via the ECU 57. The fan 55 is connected to the BMS 58, and can be supplied with the electric power from the low-voltage battery 43 via the ECU 57 and the BMS 58. The display unit 91, the lighting unit 92 and the alarm unit 93 are connected to the ECU 57, and can be supplied with the electric power from the low-voltage battery 43 via the ECU 57. As should be appreciated, in the present embodiment, when the electric power supply to the ECU 57 stops, the electric power supply to the BMS 56, the fan 55, the display unit 91, the lighting unit 91 and the alarm unit 93 also stops. Any connection means may be used as the connection between the control units and the connection between the control units and the auxiliary machines which are other than the control units. For example, CAN (controller area network) which is a standard of an in-vehicle LAN may be used.

In a state in which the low-voltage battery 43 is detached, the electric power supplied to the ECU 57 and the inverter controller 59 is cut-off. In this state, irrespective of whether or not the electric power is stored in the high-voltage battery unit 60, the electric motor 5 remains deactivated. Therefore, the vehicle will not be stolen if the user detaches the low-voltage battery 43 from the vehicle, which is an advantage.

Next, relays and switches provided on the strong electric systems will be described. Fig. 2 illustrates as examples of the relays and the switches, the charging relay 51 for opening and closing the charging wire 50, an inverter relay 36 for opening and closing the high-voltage electric wire 31, a main relay 96 for opening and closing the first electric wire 94, the converter relay 48 for opening and closing the first converter wire 46, and a main switch 97 for opening and closing the second electric wire 95. Hereinafter, among states of the relays and the switches, a state in which the corresponding wire is closed will be referred to as "connected state" and a state in which the corresponding wire is open will be referred to as "disconnected state."

The main relay 96 is provided at a position between the two connection points on the first electric wire 94 and connected to the ECU 57. The ECU 57 controls the main relay 96 to switch the main relay 96 from the connected state to the disconnected state. In this way, the ECU spontaneously determines that the electric power supplied from the high-voltage battery unit 60 to the ECU 57 via the first electric wire 94 should be cut-off.

The main switch 97 is provided on the second electric wire 95 and mechanically connected to the main key 98. The main key 98 is used to lock the vehicle body. The main key 98 may be mechanically constructed, like, for example, a cylinder lock and a mechanical key fitted in the cylinder lock, or a key having an electrically controlled configuration, such as a smart key. In any case, the main key 98 is manually operated by the rider in order to lock and unlock the vehicle body. When the rider turns ON the main key 98, the main switch 97 is placed in the connected state. When the main switch 97 is placed in the connected state, the electric power can be supplied from the low-voltage battery 43 to the ECU 57 and the inverter controller 59 via the second electric wire 95. When the rider turns OFF the main key 98, the main switch 97 is placed in the disconnected state. This can cut-off the electric power supplied from the low-voltage battery 43 to the ECU 57 via the second electric wire 95.

As described above, in the present embodiment, the two electric systems are provided to supply the electric power to the ECU 57. Therefore, the electric power supply to the ECU 57 can be suitably performed. In addition, the electric power supply to the ECU 57 can be performed flexibly. For example after the main switch 97 is turned OFF, the ECU 57 can maintain the connected state of the main relay 96. In this way, even in the state in which the main switch 97 is in the disconnected state, the ECU 57 can continue to operate by the electric power supplied from the low-voltage battery 43 via the first electric wire 94. During the operation, the ECU 57 executes a required termination process, and places the main relay 96 in the disconnected state after executing the termination process, to cut-off the electric power supplied to the ECU 57.

The charging relay 51 is connected to the BMS 58. When the BMS 58 detects that the outside electric power supply is connected to the charging connector 49, it places the charging relay 51 in the connected state so that the electric power can be supplied from the outside electric power supply to the high-voltage battery unit 60. The converter relay 48 is connected to the ECU 57. When the BMS 58 detects that the outside electric power supply is connected to the charging connector 49, it sends information indicating the detection to the ECU 57. In response to the information received from the BMS 58, the ECU 57 places the converter relay 48 in the connected state and controls the DC/DC converter 45 so that the electric power can be supplied from the outside electric power or the high-voltage battery unit 60 to the low-voltage battery 43.

The inverter relay 36 is mechanically or electrically connected to a kill switch 99. The kill switch 99 is manually operated by the rider and automatically operated by the ECU 57. When the kill switch 99 is operated manually or automatically, the inverter relay 36 is placed in the disconnected state, and the electric power supplied from the high-voltage battery unit 60 to the inverter 20 and hence the electric motor 5 is cut-off.

The electric motorcycle 1 includes a ground leakage detector 53 for detecting a ground leakage in the high-voltage battery unit 60 and a ground leakage in the high-voltage electric wire which is a system for supplying the electric power from the high-voltage battery unit 60 to the inverter 20. The ground leakage detector 53 is connected to the BMS 58. When the ground leakage detector 53 detects some abnormality, the BMS 58 sends information indicating this detection to the ECU 57.

When the ground leakage detector 53 detects some abnormality, the ECU 57 places the converter relay 48 in the disconnected state. Thereby, the electric power supplied from the high-voltage battery unit 60 to the low-voltage battery 43 is cut-off so that the low-voltage battery 43 is electrically independent of the high-voltage battery unit 60. Then, the ECU 57 operates by the electric power supplied from the low-voltage battery 43 via the first electric wire 94 or the second electric wire 95. Thus, even if some abnormality occurs in the system for supplying the electric power from the high-voltage battery unit 60 to the electric motor 5, the electric power supplied from the high-voltage battery unit 60 to the low-voltage battery 43 is cut-off so that the low-voltage battery 43 is electrically independent of the high-voltage battery unit 60. Therefore, it becomes possible to avoid a situation in which the abnormality affects the low-voltage battery 43. Thus, under the state in which the electric power supplied from the high-voltage battery unit 60 to the low-voltage battery 43 is cut-off, the ECU 57 can continue to operate by the electric power supplied from the low-voltage battery 43.

This allows the ECU 57 to continue to perform control, even when some abnormality occurs in the system. For example, the ECU 57 causes the display unit 91 and the alarm unit 93 to operate to notify the user that the abnormality has occurred. In addition to this, under the state in which the electric power supplied from the high-voltage battery unit 60 to the electric motor 5 is cut-off, the ECU 57 maintains a state in which the handle is unlocked or regenerative braking is deactivated. This allows the vehicle to be easily moved by hands or by traction.

When the ground leakage detector 53 detects some abnormality, the ECU 57 may operate the kill switch 99 to place the inverter relay 36 in the disconnected state. Thereby, the electric power supplied from the high-voltage battery unit 60 to the electric motor 5 can be cut-off. Alternatively, the BMS 58 may place the charging relay 51 in the disconnected state. This makes it possible to prevent a situation in which the ground leakage in the high-voltage battery unit 60 affects the charging connector 49 which can be accessed by the user.

When the rider manually operates the kill switch 99, the inverter relay 36 is placed in the disconnected state in response to this operation, and the electric power supplied from the high-voltage battery unit 60 to the electric motor 5 is cut-off. At this time, ECU 57 can continue to operate by the electric power supplied from the low-voltage battery 43, which makes it possible to prevent the auxiliary machines from being activated or deactivated incorrectly. At this time, the ECU 57 may place the converter relay 48 in the disconnected state so that the low-voltage battery 43 is electrically independent of the high-voltage battery unit 60. After that, at appropriate time, the ECU 57 can cut-off the electric power supplied from the low-voltage battery 43 to the ECU 57. When the kill switch 99 is operated (OFF command or termination command is input) in the middle of the driving, the ECU 57 may continue to operate by the electric power supplied from the low-voltage battery 43 in a state in which the electric power supplied from the high-voltage battery unit 60 to the electric motor 5 is cut-off, until the ECU 57 detects that the vehicle is stopped, and may cut-off the electric power supplied from the low-voltage battery 43 to the ECU 57 when it detects that the vehicle is stopped. This allows the auxiliary machines to continue to operate after the OFF command is input, during the driving of the vehicle, which is an advantage. The ECU 57 is connected to a speed sensor 71 attached to the wheel (either one or both of the front wheel 2 and the rear wheel 3) and may detect whether or not the vehicle is stopped in response to the input received from the speed sensor 71. In accordance with this configuration, it can be detected more accurately that the vehicle is stopped than in the case where the detection is performed based on the rotational speed of the electric motor 5.

The ECU 57 and the BMS 58 are placed outside the battery case 80. Because of this, the system for connecting the low-voltage battery 43 to the ECU 57, and the system for connecting the ECU 57 to the BMS 58 can be laid out only outside the battery case 80. In this way, the wires can be laid out in a simplified manner. Since the system for connecting the low-voltage battery 43 to the ECU 57 is placed outside the battery case 80, the main switch 96 and the main relay 96 are also placed outside the battery case 80. Since the ECU 57 and the main key 98 are placed outside the battery case 80, the wire for connecting the main switch 96 to the main key 98 and the wire for connecting the ECU 57 to the main relay 97 can also be laid out in a simplified manner.

Figure 4:
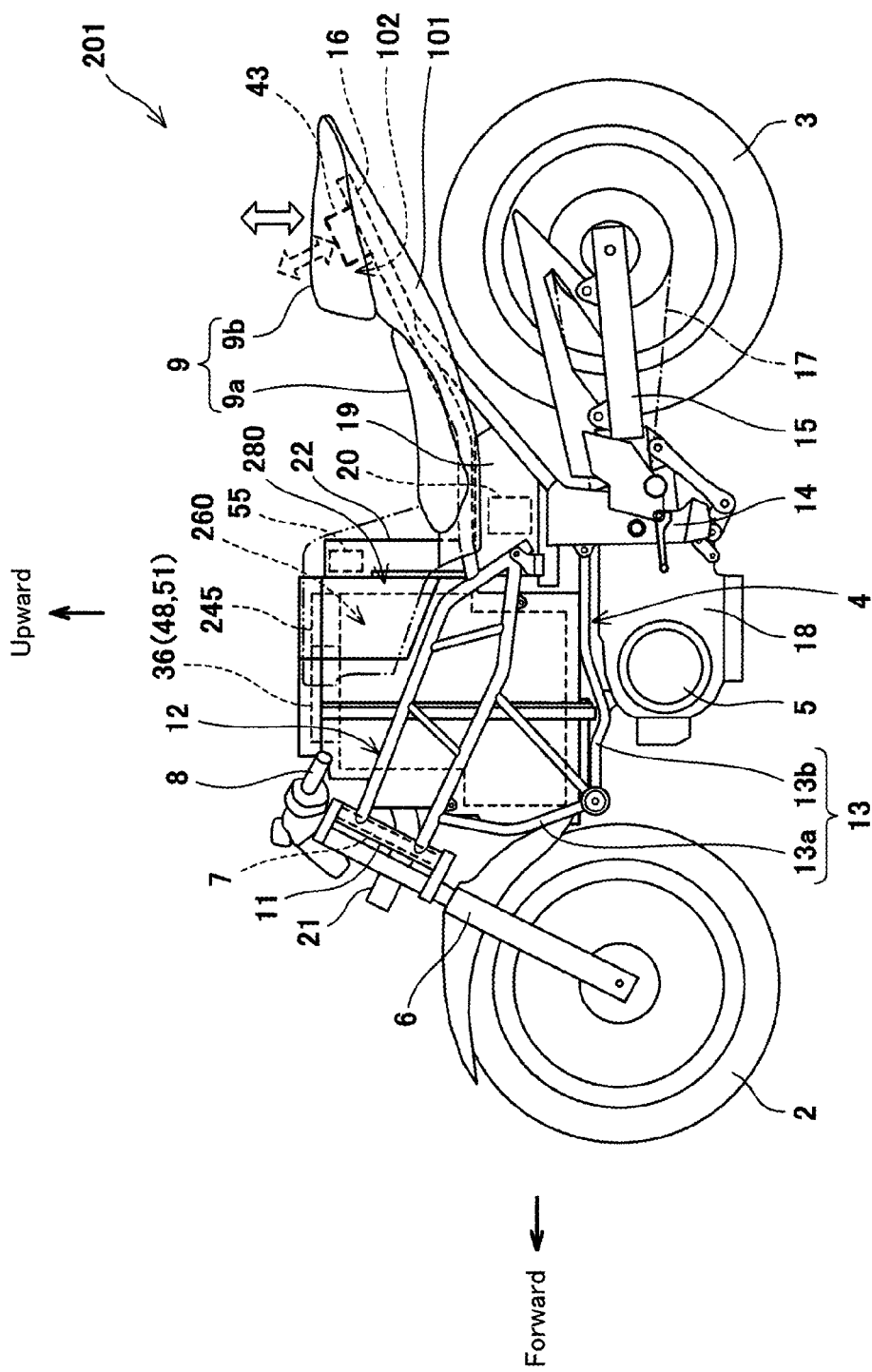
Fig. 4 is a right side view of an electric motorcycle which is an exemplary straddle electric vehicle according to Embodiment 2 of the present invention.

Fig. 4 is a side view of an electric motorcycle 201 which is an exemplary straddle electric vehicle according to Embodiment 2 of the present invention. The present embodiment is different from the above described embodiment in the position of a DC/DC converter 245. Hereinafter, a difference between Embodiment 2 and the above described embodiment will be mainly described.

As shown in Fig. 4, the DC/DC converter 245 is placed in an upper space in the interior of a battery case 280. Specifically, the DC/DC converter 245 is mounted to the rear portion of the upper surface of a high-voltage battery unit 260. By comparison, the low-voltage battery 43 is placed below the passenger seat 9b. The passenger seat 9b is mounted to the rear portion of the seat frame 16 extending rearward such that the passenger seat 9b is inclined upward. The passenger seat 9b is placed at a relatively high position. In the present embodiment, there is a vertical level difference between the passenger seat 9b and the rider seat 9a. The passenger seat 9b is higher than the rider seat 9a. This allows the battery storage space 102 to have an increased vertical dimension and to be placed at a higher position. Since the DC/DC converter 245 and the low-voltage battery 43 are placed at an upper side in this way, the wire of the second converter wire can be reduced in length.

Numeral modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

For example, the battery case 80 is not necessarily manufactured using an insulative material, but may be manufactured using a metal material such as aluminum alloy. When the aluminum alloy is used for the battery case 80, the high-voltage electric wire can be reduced in length in the above described manner, and the battery case 80 can be thinned to reduce its weight, while achieving a required strength. The DC/DC converter 45 may be covered with a case which is different from the battery case 80. In this case, the case is preferably insulated from an outside space, and thus the DC/DC converter can be isolated mechanically and electrically from the user.

Although the electric motorcycle has been exemplary described in the embodiments of the present invention, the present invention is applicable to a straddle electric vehicle including a high-voltage battery for activating the electric motor and a low-voltage battery for activating auxiliary machines. For example, the present invention is applicable to other straddle vehicles such as an all terrain vehicle (ATV), a three-wheeled vehicle and personal watercraft. Although the vehicle which does not include an internal combustion engine and drives only by the driving power generated by the electric motor is exemplary described as the electric vehicle, the present invention is also applicable to a hybrid vehicle including the internal combustion engine in addition to the electric moor.

INDUSTRIAL APPLICABILITY

The present invention has advantages that a high-voltage electric wire, of electric wires connecting batteries to each other, can be reduced to a smallest possible degree, and is effectively applicable to straddle electric vehicles such as an electric motorcycle.

The invention claimed is:

1. A straddle electric vehicle comprising:
an electric motor which is a driving power source for activating the vehicle;
a high-voltage battery for storing electric power supplied to the electric motor;
a low-voltage battery for storing the electric power supplied to an auxiliary machine mounted in the vehicle;
a converter which drops a voltage of the electric power supplied from the high-voltage battery to the low-voltage battery into a voltage to be charged into the low-voltage battery; and
a case which defines a closed inner space for storing the high-voltage battery;
wherein the low-voltage battery is placed outside the case, and the converter is stored in the case, and
wherein the case is made of an insulating material.

2. The straddle electric vehicle according to claim 1, wherein the low-voltage battery is detachably mounted to a body of the vehicle.

3. The straddle electric vehicle according to claim 1, comprising:
a control unit for controlling the vehicle;
a first electric wire for connecting the control unit to the low-voltage battery; and
a relay which is provided on the first electric wire and performs switching between a connected state in which the control unit is connected to the low-voltage battery and a disconnected state in which the control unit is disconnected from the low-voltage battery;
wherein the auxiliary machine includes the control unit, and the control unit operates by the electric power supplied from the low-voltage battery via the first electric wire; and
wherein the relay is switched between the connected state and the disconnected state in accordance with a command from the control unit.

4. The straddle electric vehicle according to claim 3, comprising:
a second electric wire for connecting the control unit to the low-voltage battery, the second electric wire being different from the first electric wire; and
a switch which is provided on the second electric wire and performs switching between the connected state in which the control unit is connected to the low-voltage battery and the disconnected state in which the control unit is disconnected from the low-voltage battery;
wherein the switch is switched between the connected state and the disconnected state in accordance with a rider's operation.

5. The straddle electric vehicle according to claim 1, comprising:
an abnormality detector for detecting whether or not there is an abnormality in a system for supplying the electric power from the high-voltage battery to the electric motor;
wherein the auxiliary machine includes a control unit for controlling the high-voltage battery or the electric motor; and
wherein when the abnormality detector detects the abnormality, the control unit cuts-off the electric power supplied from the high-voltage battery to the electric motor or the low-voltage battery and operates by the electric power supplied from the low-voltage battery.

6. The straddle electric vehicle according to claim 1, comprising:
a relay stored in the case.

7. The straddle electric vehicle according to claim 1, comprising:
an inverter for converting DC power stored in the high-voltage battery into AC power; and
an inverter case for storing the inverter;
wherein the inverter case is provided separately from the case for storing the high-voltage battery.

8. The straddle electric vehicle according to claim 7, wherein the inverter case is placed in the vicinity of the case for storing the high-voltage battery; and
wherein the low-voltage battery is placed to be distant from the case for storing the high-voltage battery.

9. The straddle electric vehicle according to claim 1, wherein the case is placed rearward relative to the head pipe and faces the head pipe in a forward and rearward direction,
wherein the converter is placed in an upper portion in an interior of the case, and between the head pipe and the high-voltage battery in the forward and rearward direction.

10. The straddle electric vehicle according to claim 1, comprising:

a front wheel;
a rider seat; and
a passenger seat placed rearward relative to the rider seat;
wherein the high-voltage battery is placed between the front wheel and the rider seat; and
wherein the low-voltage battery is placed below the passenger seat.

11. A straddle vehicle comprising:
an electric motor which is a driving power source for activating the vehicle;
a high-voltage battery for storing electric power supplied to the electric motor:
a low-voltage battery for storing the electric power supplied to an auxiliary machine mounted in the vehicle;
a converter for converting a voltage of the electric power supplied from the high-voltage battery to the low-voltage battery into a voltage to be charged into the low-voltage battery;
a case for storing the high-voltage battery; and
a relay stored in the case,
wherein the low-voltage battery is placed outside the case, and the converter is stored in the case, and
wherein the relay includes an inverter relay, a converter relay, and a charging relay.

12. A straddle electric vehicle comprising:
an electric motor which is a driving power source for activating the vehicle;
a high-voltage battery for storing electric power supplied to the electric motor;
a low-voltage battery for storing the electric power supplied to an auxiliary machine mounted in the vehicle;
a converter for converting a voltage of the electric power supplied from the high-voltage battery to the low-voltage battery into a voltage to be charged into the low-voltage battery; and
a case for storing the high-voltage battery;
wherein the auxiliary machine includes a control unit for controlling the high-voltage battery or the electric motor, and the control unit operates by the electric power supplied from the low-voltage battery; and
wherein in response to an OFF command received, the control unit cuts-off the electric power supplied from the high-voltage battery to the electric motor or the low-voltage battery and then cuts-off the electric power supplied from the low-voltage battery to the control unit.

13. The straddle electric vehicle according to claim 12, wherein in response to an OFF command received in the middle of driving, the control unit cuts-off the electric power supplied from the high-voltage battery to the electric motor or the low-voltage battery, and cuts-off the electric power supplied from the low-voltage battery to the control unit when the control unit detects that the vehicle is stopped.

14. The straddle electric vehicle according to claim 13, wherein the control unit detects whether or not the vehicle is stopped based on an input received from a speed sensor attached on a wheel.

* * * * *

UNITED STATES PATENT AND TRADEMARK OFFICE
CERTIFICATE OF CORRECTION

PATENT NO.        : 9,656,551 B2
APPLICATION NO.   : 14/354555
DATED             : May 23, 2017
INVENTOR(S)       : Yoshimoto Matsuda It is certified that error appears in the above-identified patent and that said Letters Patent is hereby corrected as shown below:

On the Title Page

In item (30), Foreign Application Priority Data:
Delete "2011-006062" and insert --PCT JP2011 006062--.

Signed and Sealed this
Twenty-eighth Day of November, 2017

Joseph Matal
*Performing the Functions and Duties of the*
*Under Secretary of Commerce for Intellectual Property and*
*Director of the United States Patent and Trademark Office*